(12) United States Patent
Shibayama et al.

(10) Patent No.: US 8,477,305 B2
(45) Date of Patent: Jul. 2, 2013

(54) SPECTROSCOPE

(75) Inventors: Katsumi Shibayama, Hamamatsu (JP);
Tomofumi Suzuki, Hamamatsu (JP);
Masashi Ito, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/177,804

(22) Filed: Jul. 7, 2011

(65) Prior Publication Data
US 2011/0261356 A1 Oct. 27, 2011

Related U.S. Application Data

(63) Continuation of application No. 12/377,309, filed as application No. PCT/JP2008/060377 on Jun. 5, 2008, now Pat. No. 8,031,336.

(30) Foreign Application Priority Data

Jun. 8, 2007 (JP) ................. 2007-153029
Jun. 8, 2007 (JP) ................. 2007-153039

(51) Int. Cl.
*G01J 1/42* (2006.01)
*G01J 1/44* (2006.01)

(52) U.S. Cl.
USPC .......................... 356/328; 356/326

(58) Field of Classification Search
USPC .................. 356/326, 328; 359/558, 566, 569, 359/570, 572
See application file for complete search history.

(56) References Cited

U.S. PATENT DOCUMENTS

| 4,644,632 | A | | 2/1987 | Mächler et al. |
| 4,784,935 | A | | 11/1988 | Ehrfeld et al. |
| 5,026,160 | A | | 6/1991 | Dorain et al. |
| 5,644,124 | A | * | 7/1997 | Hamada et al. ............... 250/216 |
| 5,940,214 | A | | 8/1999 | Suzuki et al. |
| 6,081,331 | A | | 6/2000 | Teichmann |

(Continued)

FOREIGN PATENT DOCUMENTS

| CN | 1800941 | 7/2006 |
| DE | 197 17 015 | 10/1998 |

(Continued)

OTHER PUBLICATIONS

Francis Reininger et al., "VIRTIS: Visible Infrared Thermal Imaging Spectrometer for the Rosetta mission," Proceedings SPIE, Nov. 1996, pp. 66-77, vol. 2819.

*Primary Examiner* — Gregory J Toatley
*Assistant Examiner* — Dominic J Bologna
(74) *Attorney, Agent, or Firm* — Drinker Biddle & Reath LLP

(57) ABSTRACT

The spectrometer 1 is provided with a package 2 in which a light guiding portion 7 is provided, a spectroscopic module 3 accommodated inside the package 2, and a support member 29 arranged on an inner wall plane of the package 2 to support the spectroscopic module 3. The spectroscopic module 3 is provided with a body portion 11 for transmitting light made incident from the light guiding portion 7 and a spectroscopic portion 13 for dispersing light passed through the body portion 11 on a predetermined plane of the body portion 11, and the spectroscopic portion 13 is supported by the support member 29 on the predetermined plane in a state of being spaced away from the inner wall plane.

9 Claims, 15 Drawing Sheets

U.S. PATENT DOCUMENTS

| | | |
|---|---|---|
| 6,181,418 B1 | 1/2001 | Palumbo et al. |
| 6,303,934 B1 | 10/2001 | Daly et al. |
| 6,657,723 B2 | 12/2003 | Cohen et al. |
| 6,862,092 B1 | 3/2005 | Ibsen et al. |
| 7,034,935 B1 | 4/2006 | Kruzelecky |
| 7,092,090 B2 | 8/2006 | Shimizu et al. |
| 7,369,228 B2 | 5/2008 | Kerstan et al. |
| 7,605,917 B2 | 10/2009 | Teichmann et al. |
| 7,697,137 B2 | 4/2010 | Comstock, II |
| 2003/0197862 A1 | 10/2003 | Cohen et al. |
| 2004/0196458 A1 | 10/2004 | Shimizu et al. |
| 2004/0239931 A1* | 12/2004 | Teichmann et al. .......... 356/328 |
| 2005/0230844 A1 | 10/2005 | Kinsman |
| 2006/0139636 A1* | 6/2006 | Kerstan et al. ............... 356/328 |
| 2007/0002446 A1 | 1/2007 | Takeuchi et al. |
| 2007/0252989 A1 | 11/2007 | Comstock |
| 2010/0103412 A1 | 4/2010 | Shibayama et al. |
| 2010/0201980 A1 | 8/2010 | Shibayama et al. |
| 2010/0208257 A1 | 8/2010 | Shibayama et al. |
| 2010/0208259 A1 | 8/2010 | Suzuki et al. |
| 2010/0214563 A1 | 8/2010 | Suzuki et al. |
| 2010/0238439 A1 | 9/2010 | Suzuki et al. |
| 2012/0140214 A1 | 6/2012 | Shibayama et al. |

FOREIGN PATENT DOCUMENTS

| | | |
|---|---|---|
| JP | 54-143685 | 11/1979 |
| JP | S61-217017 A | 9/1986 |
| JP | 62-6126 | 1/1987 |
| JP | 63-229765 | 9/1988 |
| JP | H4-211202 A | 8/1992 |
| JP | 4-294223 | 10/1992 |
| JP | H5-149793 | 6/1993 |
| JP | 5-322653 | 12/1993 |
| JP | 6-129908 | 5/1994 |
| JP | 6-229829 | 8/1994 |
| JP | 8-145794 | 6/1996 |
| JP | 2000-065642 A | 3/2000 |
| JP | 2000-298066 | 10/2000 |
| JP | 3119917 | 10/2000 |
| JP | 2003-121349 A | 4/2003 |
| JP | 2003-139611 | 5/2003 |
| JP | 2003-161694 A | 6/2003 |
| JP | 2003-202463 | 7/2003 |
| JP | 2003-243444 | 8/2003 |
| JP | 2003-318478 | 11/2003 |
| JP | 2003-337206 | 11/2003 |
| JP | 2004-053992 A | 2/2004 |
| JP | 2004-191246 | 7/2004 |
| JP | 2004-309146 A | 11/2004 |
| JP | 2004-354176 | 12/2004 |
| JP | 2004-537750 | 12/2004 |
| JP | 2005-308495 | 11/2005 |
| JP | 2006-30031 | 2/2006 |
| JP | 4887221 | 2/2012 |
| JP | 4887250 | 2/2012 |
| JP | 4887251 | 2/2012 |
| JP | 4891841 | 3/2012 |
| WO | WO 99/53350 | 10/1999 |

* cited by examiner

SPECTROSCOPE

This is a continuation application of copending application Ser. No. 12/377,309, having a §371 date of Feb. 12, 2009, which is a national stage filing based on PCT International Application No. PCT/JP2008/060377, filed on Jun. 5, 2008. The copending application Ser. No. 12/377,309 is incorporated by reference herein in its entirety.

TECHNICAL FIELD

The present invention relates to a spectrometer in which a spectroscopic module is accommodated inside a package.

BACKGROUND ART

A spectrometer is an optical device for decomposing light to be measured into individual spectral components by using a spectroscopic portion such as a prism and a diffraction grating (refer to Patent Document 1, for example). According to the above-described spectrometer, a light detecting element is used to detect spectral components of the light dispersed by the spectroscopic portion, thus making it possible to know the wavelength distribution of light, the intensity of a specific wavelength component and others.

Patent Document 1: Japanese Published Unexamined Patent Application No. H08-145794

DISCLOSURE OF THE INVENTION

Problem to be Solved by the Invention

In recent years, there has been developed a small-sized spectrometer applicable to various types of spectrometric devices and spectrometric systems. In the small-sized spectrometer, it is necessary to arrange individual optical elements such as a light incident portion, a light detecting element and a spectroscopic portion at a high positional accuracy and also make a package compact. The thus arranged small-sized spectrometer is able to make a photometric analysis instantly irrespective of a place where it is placed and, therefore, useable in environmental measurement, confirmation of sugar content of fruits or the like, and color calibration of a printer or the like. Thus, the spectrometer may be subjected to vibration or thermal load, depending on the use environment thereof, thereby the positional accuracy of individual optical elements are affected thereof. As a result, the small-sized spectrometer is, in particular, required to be highly reliable in order to cope with various use environments.

The above Patent Document 1 has disclosed a spectrometer which is provided with an optical bench on which various optical elements are mounted and a vessel in which the optical bench is accommodated. In this spectrometer, the optical bench is provided with an element attachment portion to which the optical elements are attached and a vessel fixture portion fixed to the vessel, and the element attachment portion is constituted so as to cantilever the vessel fixture portion.

Where the spectrometer disclosed in the Patent Document 1 is downsized, a clearance is made narrower between an inner wall plane of the vessel and various optical elements to be accommodated. Then, the element attachment portion is constituted so as to cantilever the vessel fixture portion. Therefore, when a spectrometer is subjected to vibration or thermal load, an optical element is brought into contact with the inner wall plane of the vessel and may be broken in some cases.

The present invention has been made in view of the above-described situation, an object of which is to provide a spectrometer which can be downsize while maintaining reliability.

Means for Solving the Problem

In order to attain the above object, the spectrometer of the present invention is constituted with a package on which a light-guiding portion is provided, a spectroscopic module accommodated inside the package, and a support member arranged on an inner wall plane of the package to support the spectroscopic module, in which the spectroscopic module is provided with a body portion for transmitting light made incident from the light-guiding portion and a spectroscopic portion for dispersing light passed through the body portion on a predetermined plane of the body portion, and the spectroscopic portion is supported by the support member on the predetermined plane in a state of being spaced away from the inner wall plane.

In the spectrometer, in a state that the spectroscopic portion provided on a predetermined plane of the body portion is spaced away from the inner wall plane of the package, the spectroscopic module is supported by the support member on the predetermined plane of the body portion. Therefore, where the spectrometer is downsized, it is possible to prevent the spectroscopic portion from being in contact with the inner wall plane of the package upon application of vibration or thermal load to the spectrometer. Thus, the spectrometer can be downsize while maintaining reliability.

Further, in the spectrometer of the present invention, it is preferable that at least a pair of the support members are arranged so as to oppose each other behind the spectroscopic portion. Thereby, it is possible to more reliably prevent the spectroscopic portion from being in contact with the inner wall plane of the package.

Further, in the spectrometer of the present invention, it is preferable that the support members are formed annularly so as to enclose the spectroscopic portion. Thereby, it is possible to more reliably prevent the spectroscopic portion from being in contact with the inner wall plane of the package and also block the spectroscopic portion from stray light.

Further, it is preferable that the spectrometer of the present invention is provided with a lead pin, which penetrates through the package, in which the spectroscopic module is provided with an electrode pad electrically connected to the lead pin by a wire and supported by the support member at a part opposing the electrode pad on the predetermined plane. Thereby, the support member acts as a base in connecting the electrode pad to the lead pin by wire bonding, thus making it possible to prevent the spectroscopic module from breakage or the like.

Further, it is preferable that the spectrometer of the present invention is provided with the body portion formed in a plate shape, in which a light incident portion for making light incident from the light-guiding portion into the body portion, a light detecting element for detecting light dispersed by the spectroscopic portion and an electrode pad are provided on a plane opposing the predetermined plane at the body portion. Thereby, it is possible to make the spectroscopic module thin and also downsize the spectrometer.

Still further, in the spectrometer of the present invention, it is preferable that the light-guiding portion is provided with an optical fiber extending inside the package and the end of the optical fiber is in contact with the light incident portion. Thereby, the optical fiber constituting the light-guiding portion can be easily positioned, thereby light can be reliably made incident from the light-guiding portion into the light incident portion.

In addition, in the spectrometer of the present invention, it is preferable that the package is provided with a cap made with a metal material and a stem made with a metal material, the cap and the stem are jointed by welding, and the spectroscopic portion contains a resin material. Since the cap and the stem are jointed by welding, it is possible to provide a hermetic package and further increase the reliability. Further, since the spectroscopic portion contains a resin material, it can be easily formed in a predetermined shape. Still further, since the package is spaced away from the spectroscopic portion by the support member, it is possible to decrease heat on welding which is transferred to the spectroscopic portion. Therefore, it is possible to protect the spectroscopic portion containing a resin material which is vulnerable to heat-related defects.

In order to attain the above object, the spectrometer of the present invention is constituted with a package on which a light-guiding portion is provided, a spectroscopic module accommodated inside the package, and a support member arranged on an inner wall plane of the package to support the spectroscopic module, in which the spectroscopic module is provided with a body portion for transmitting light made incident from the light-guiding portion and a spectroscopic portion for dispersing light passed through the body portion on a predetermined plane of the body portion, the support member is provided with an annular portion which encloses the spectroscopic portion to support the spectroscopic module on the predetermined plane in a state that the spectroscopic portion is spaced away from the inner wall plane, and a light absorbing portion is packed in a space formed inside the annular portion.

In the spectrometer, the support member which supports the spectroscopic module is provided with an annular portion enclosing the spectroscopic portion and the light absorbing portion is packed in a space formed inside the annular portion. Therefore, it is possible to reliably block stray light entering into the spectroscopic portion from outside and also absorb the stray light generated inside the spectroscopic portion. Thus, there is no chance to detect the stray light as noise.
As a result, it is possible to downsize the spectrometer while maintaining reliability, in particular, accurate spectral characteristics.

Further, in the spectrometer of the present invention, it is preferable that the support member is provided with a plate-shaped portion for closing the end of the annular portion on the inner wall plane of the package. Thereby, a light absorbing material which acts as the light absorbing portion can be packed in a space previously formed inside the annular portion in fixing the support member inside the package. It is, therefore, possible to produce easily the spectrometer in which the light absorbing portion is formed.

Further, it is preferable that the spectrometer of the present invention is provided with a lead pin which penetrates through the package, in which the spectroscopic module is provided with an electrode pad electrically connected to the lead pin by a wire and supported by the support member at a part opposing the electrode pad on the predetermined plane. Thereby, in connecting the electrode pad to the lead pin by wire bonding, the support member acts as a base, thus making it possible to prevent the spectroscopic module from breakage or the like.

Further, it is preferable that the spectrometer of the present invention is provided with the body portion formed in a plate shape, in which a light incident portion for making light incident from the light-guiding portion into the body portion, a light detecting element for detecting light dispersed by the spectroscopic portion and an electrode pad are provided on a plane opposing the predetermined plane at the body portion. Thereby, it is possible to make the spectroscopic module thin and also downsize the spectrometer.

Still further, in the spectrometer of the present invention, it is preferable that the light-guiding portion is provided with an optical fiber extending inside the package and the end of the optical fiber is in contact with the light incident portion. Thereby, the optical fiber constituting the light-guiding portion can be easily positioned to reliably make light incident from the light-guiding portion into the light incident portion.

In addition, in the spectrometer of the present invention, it is preferable that the package is provided with a cap made with a metal material and a stem made with a metal material, the cap and the stem are jointed by welding, and the spectroscopic portion contains a resin material. Since the cap and the stem are jointed by welding, it is possible to provide a hermetic package and increase the reliability. Further, since the spectroscopic portion contains a resin material, it can be easily formed in a predetermined shape. Still further, since the package is spaced away from the spectroscopic portion by the support member, it is possible to decrease heat on welding which is transferred to the spectroscopic portion. Therefore, it is possible to protect the spectroscopic portion containing a resin material which is vulnerable to heat-related defects.

Effect of the Invention

According to the present invention, it is possible to downsize a spectrometer while maintaining reliability.

DESCRIPTION OF REFERENCE NUMERALS

Figure 1:
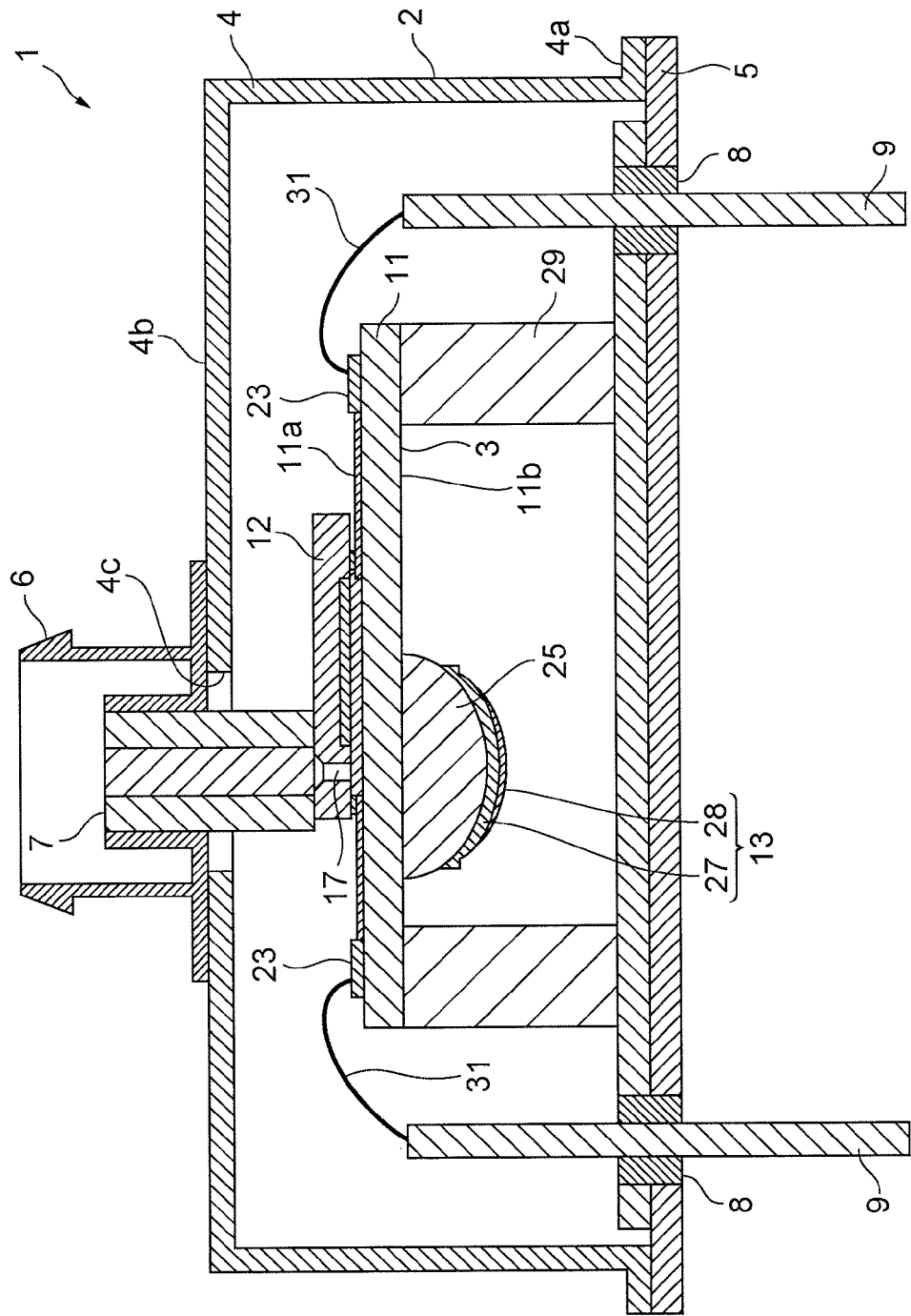
FIG. 1 is a cross sectional view of a spectrometer of a first embodiment of the present invention.

1: spectrometer
2: package

3: spectroscopic module
4: cap
5: stem
7: optical fiber (light-guiding portion)
9: lead pin
11: substrate (body portion)
12: light detecting element
13: spectroscopic portion
17: light incident portion (opening portion)
23: electrode pad
29: support member
31: wire
40: annular portion
41: light absorbing portion
43: support member
43a: side wall (annular portion)
43b: lower wall

BEST MODES FOR CARRYING OUT THE INVENTION

Findings of the present invention will be easily understood by referring to the attached drawings shown exclusively for exemplification and considering a detailed description below. Further, a description will be given for embodiments of the present invention by referring to the attached drawings. The same reference letters or numerals are given to the same compositions, where possible, with an overlapping description omitted.

First Embodiment

Figure 2:
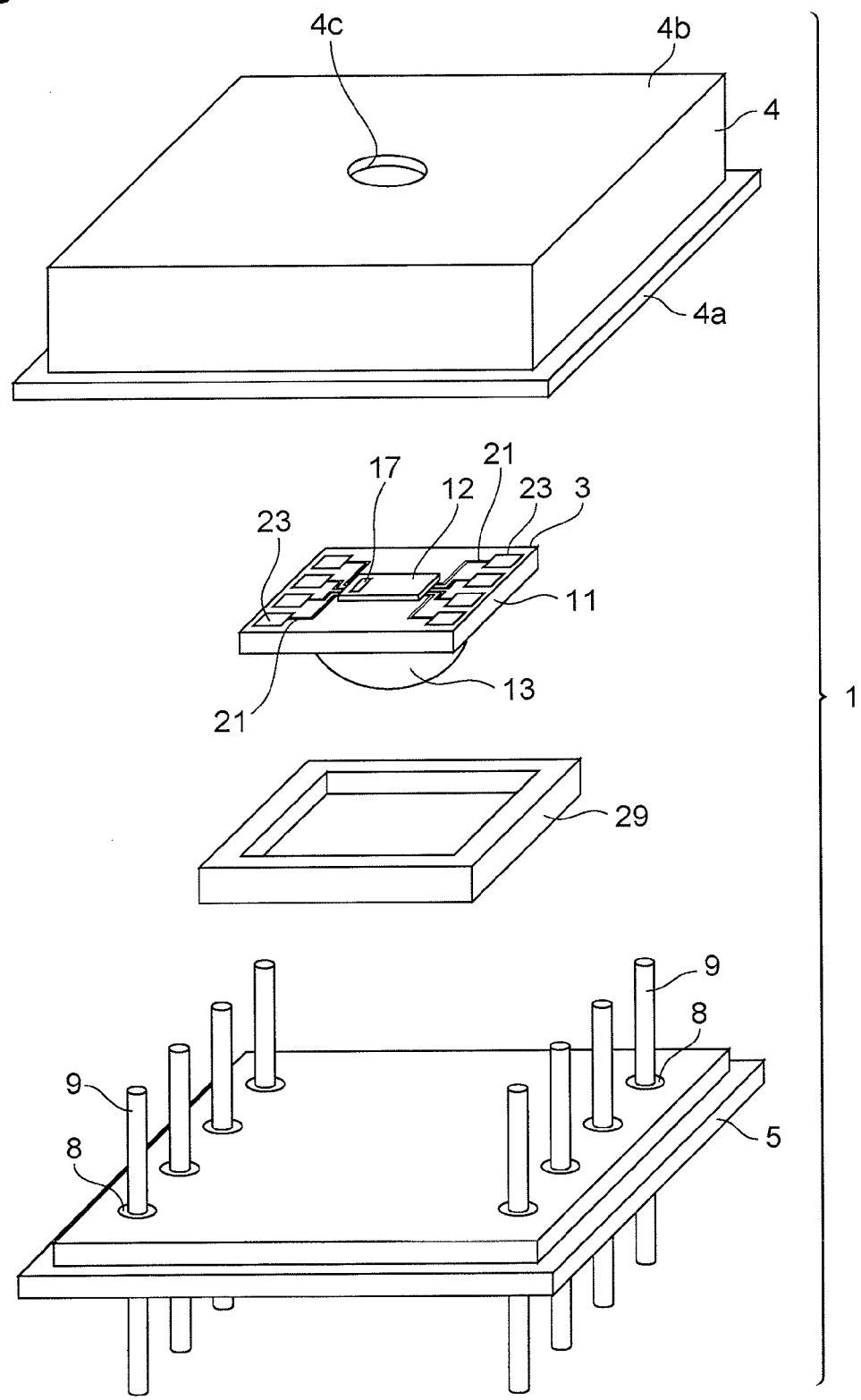
FIG. 2 is an exploded perspective view of the spectrometer given in FIG. 1.

As shown in FIG. 1 and FIG. 2, a spectrometer 1 of a first embodiment of the present invention is an apparatus in which a spectroscopic module 3 accommodated inside a package 2 is used to disperse target light made incident from outside into the package 2, thereby spectra of the thus dispersed light is detected and output.

The package 2 is constituted with a so-called CAN package which contains a rectangular-solid box-shaped metal cap 4 opened at one end and a rectangular plate-shaped metal stem 5 having a stepped portion at a peripheral edge. The cap 4 is provided with a flange 4a projecting from an opening end to the outside. Further, a stepped portion of the flange 4a and that of the stem 5 are jointed by welding to close an opening portion. Therefore, the package 2 can be given as a hermetic package to increase the reliability of the spectrometer 1. A cap opening portion 4c opened in a circular shape is formed on the upper wall 4b of the cap 4, and a hollow connector 6 is provided so as to cover the cap opening portion 4c. An optical fiber 7 (light-guiding portion) is inserted into a hollow portion of the connector 6. It is noted that the connector 6 and the optical fiber 7 are omitted in FIG. 2. The optical fiber 7 extends from the cap opening portion 4c into the package 2 so as to guide the target light into the package 2. A plurality of lead pins 9 are fixed to a pair of side edge portions of the stem 5, which are opposed to each other via electrically insulating low-melting point glass 8, thereby the package 2 is hermetically sealed (air-tight seal). The lead pin 9 is made with an electrically conductive material such as copper wire, and the one end thereof extends inside the package 2, while the other end is guided to the outside of the package 2.

Figure 3:
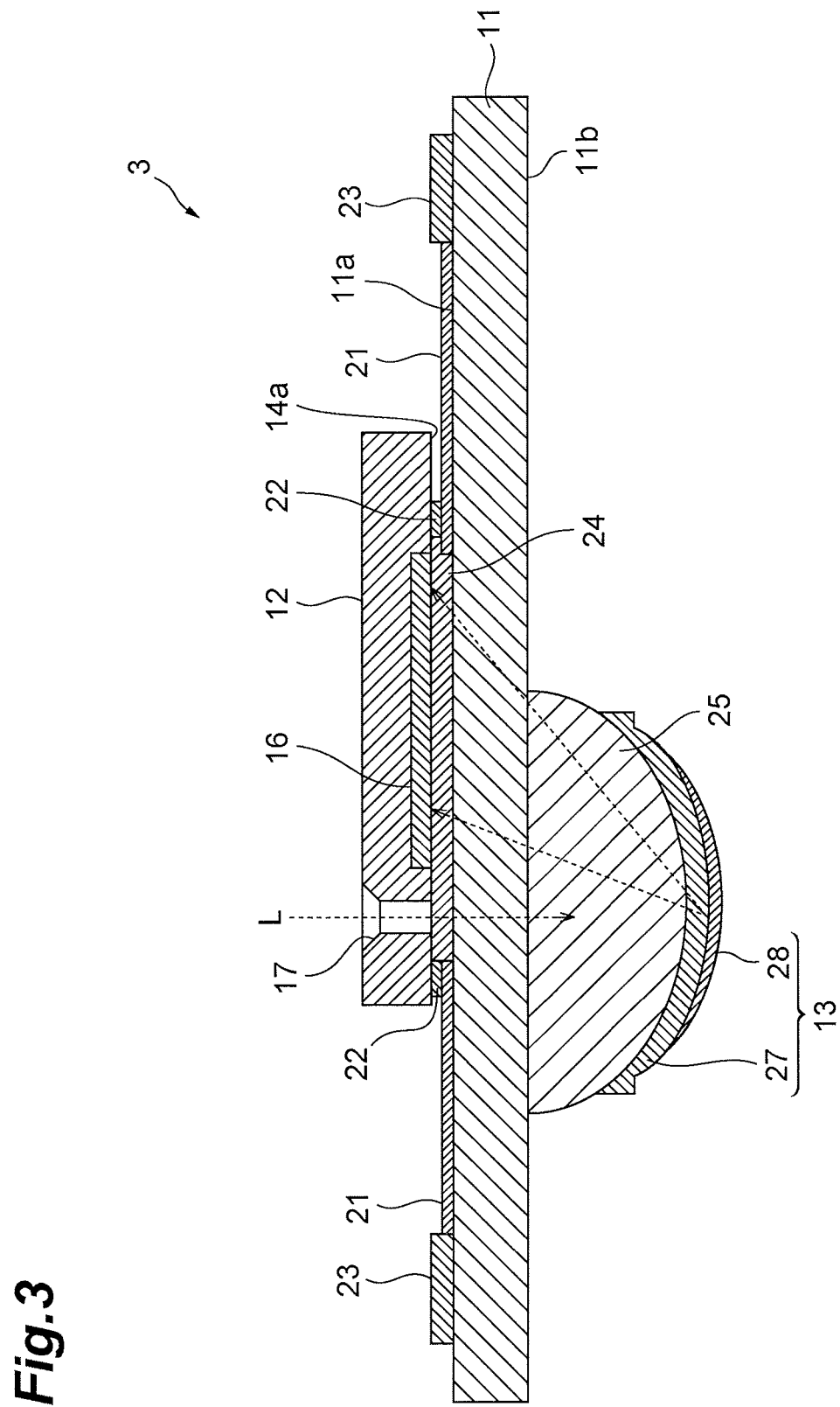
FIG. 3 is a cross sectional view of a spectroscopic module given in FIG. 1.

As shown in FIG. 3, the spectroscopic module 3 is provided with a rectangular substrate (body portion) 11 made with glass or a resin material. The substrate 11 allows target light L to be dispersed in a predetermined range to pass through, thereby retaining a light detecting element 12 and a spectroscopic portion 13, which will be described later. The light detecting element 12 for detecting light is provided approximately at the center on the upper plane 11a opposing the upper wall 4b of the cap 4 on the substrate 11.

Figure 4:
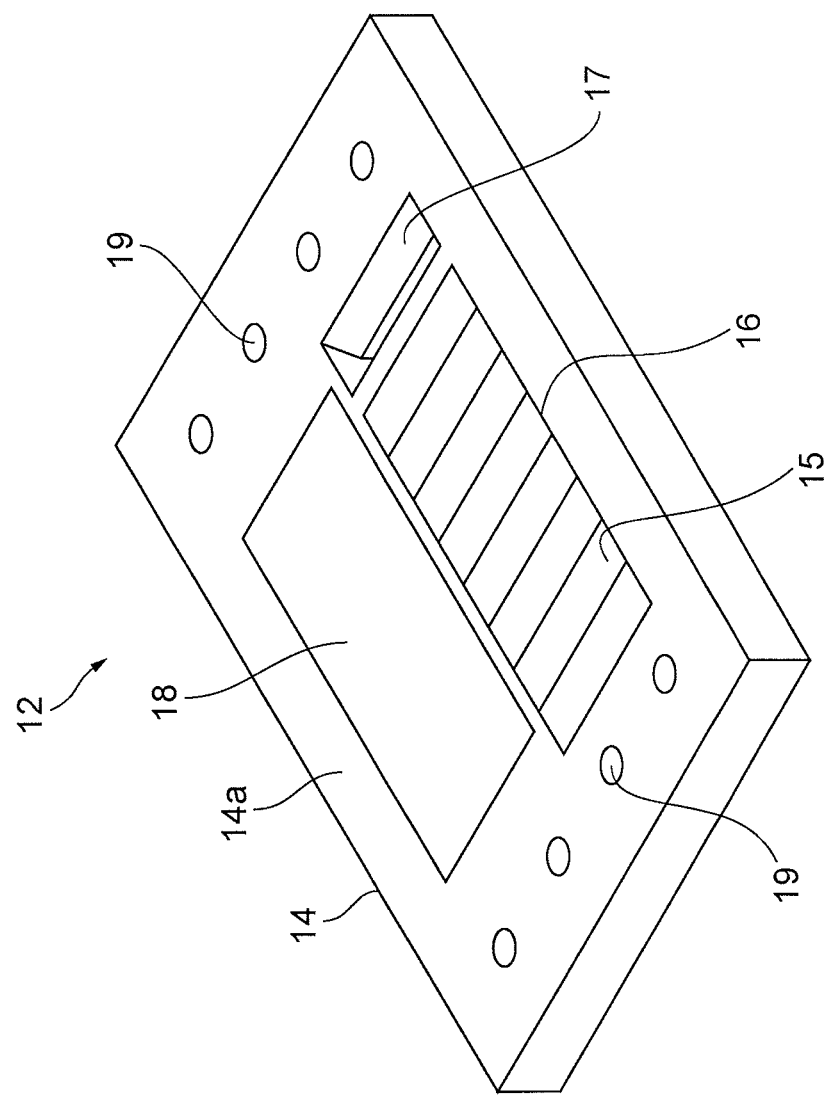
FIG. 4 is a perspective view of a light detecting element given in FIG. 3.

As shown in FIG. 4, the light detecting element 12 is provided with a semiconductor substrate 14 made with a semiconducting material, for example, silicon (Si). A photodiode array 16 having a plurality of photodiodes 15 is formed in a predetermined array on the upper plane 14a of the semiconductor substrate 14. The photodiode array 16 is used for detecting spectral components of dispersed light. It is noted that the light detecting element 12 shall not be limited to the photodiode array but may include a CCD image sensor, C-MOS image sensor and the like.

Further, a rectangular slit-shaped opening portion 17 which penetrates from the upper plane 14a to the lower plane is formed on the semiconductor substrate 14. The opening portion 17 is used as a light incident portion for making target light detected by the photodiode 15 incident into the substrate 11, where the light detecting element 12 is applied to a spectrometer mounted on the substrate 11. This is provided by being positioned in advance on the basis of a predetermined positional relationship with respect to the photodiode array 16. It is noted that the light incident portion (opening portion) 17 may be formed on the upper plane 11a of the substrate 11 as a separate body from the semiconductor substrate 14.

Still further, an electronic circuit portion 18 is provided on the upper plane 14a. A wiring, a circuit and others necessary for applying bias voltage to each of the photodiodes 15 and treating a signal are provided on the electronic circuit portion 18. In addition, bump electrode pads 19 used for inputting and outputting an electrical signal are provided respectively on the left end and the right end of the upper plane 14a.

Returning to FIG. 3, a plurality of substrate wirings 21 for sending input and output signals of the light detecting element 12 are formed on the upper plane 11a of the substrate 11. One end of each of the substrate wirings 21 is connected to a bump 22 such as Au for fixing the light detecting element 12, while the other end thereof is connected to the electrode pad 23 for external input and output which is formed at the peripheral edge on the upper plane 11a. The light detecting element 12 is subjected to bump bonding by the bump 22 so that the upper plane 14a of the semiconductor substrate 14 on which the photodiode array 16 is formed is opposed to the upper plane 11a of the substrate 11 and mounted on the substrate 11. Further, an underfill material 24 is packed into a gap made between the substrate 11 and the light detecting element 12 by bump bonding, thereby they are optically coupled.

Further, a grating base substance 25 made with a light-transmitting material such as glass or a translucent resin is provided at a predetermined position which is on a light path of target light L made incident from the light incident portion 17 on the lower plane 11b of the substrate 11 (a plane opposing a predetermined plane or the upper plane 11a). The grating base substance 25 is an approximately semi-spherical lens projecting on the lower plane 11b of the substrate 11 or to the outside of the substrate 11 at the center of a predetermined position in the vicinity thereof. The grating base substance 25 may be provided as a separate body from the substrate 11 or may be formed integrally with the substrate 11 by forming a curved plane portion having a certain curvature on the lower plane 11b of the substrate 11.

Further, a spectroscopic portion 13 is provided on the surface of the grating base substance 25. The spectroscopic portion 13 is to disperse target light L which has been made incident from the light incident portion 17 and passed through the grating base substance 25. The spectroscopic portion 13 of the present embodiment is a reflection-type concave diffraction grating constituted with a diffracting layer 27 made with a resin material and provided on the grating base substance 25 and a reflecting layer 28 made with a reflecting film of metal such as aluminum and provided on the surface of the diffracting layer 27. Still further, the surface of the diffracting layer 27, that is, a reflecting plane, is provided with a curvature radius approximately similar to the curvature radius of a curved plane (surface) of the grating base substance 25 and formed in adjustment so that a direction at which light is dispersed is in agreement with a direction at which the photodiodes 15 are arrayed in the photodiode array 16. In the present embodiment, since the diffracting layer 27 is made with a resin material, it can be easily formed in a predetermined shape. Further, the inner wall plane of the package 2, that is, the stem 5, is spaced away from the spectroscopic portion 13 by the support member 29. Thus, heat on welding the cap 4 and the stem 5 is less likely to be transferred to the spectroscopic portion 13, making it possible to protect the diffracting layer 27 made with a resin material which is vulnerable to heat-related defects.

Returning to FIG. 1 and FIG. 2, the above-described spectroscopic module 3 is supported via a rectangular annular support member 29 so as to enclose the spectroscopic portion 13 inside the package 2 and fixed to the stem 5. The support member 29 is jointed to the substrate 11 at a position of the lower plane 11b opposing a position of the electrode pad 23 formed on the upper plane 11a of the substrate 11 in the spectroscopic module 3. Therefore, the support member 29 acts as a base in connecting the electrode pad 23 to the lead pin 9 by wire bonding, thus making it possible to prevent the spectroscopic module 3 from breakage or the like. Further, the support member 29 used here is such that the height thereof is greater than that of the spectroscopic portion 13 (reflecting layer 28) projected from the substrate 11 to the outside and arranged so that the stem 5 is spaced away from the spectroscopic portion 13. Still further, the spectroscopic portion 13 is arranged so as to be sealed inside the rectangular annular support member 29. Thereby, it is possible to reliably prevent the spectroscopic portion 13 from being in contact with the stem 5 and also block the spectroscopic portion 13 from stray light.

The spectroscopic module 3 fixed by the support member 29 is arranged so that the light incident portion 17 is adjusted at a position opposing the end of the optical fiber 7, which is a light-guiding portion. Further, the end of the optical fiber 7 guided into the package 2 is inserted so as to be in contact with the light incident portion 17 of the spectroscopic module 3. Therefore, the optical fiber 7 constituting the light-guiding portion is easily positioned, and light can be reliably made incident from the optical fiber 7 into the light incident portion 17.

Further, the electrode pad 23 formed on the upper plane 11a of the substrate 11 is electrically connected to the lead pin 9 of the stem 5 with a wire 31 by wire bonding.

In the thus constituted spectrometer 1, target light L guided from the optical fiber 7 and made incident from the light incident portion 17 provided on the semiconductor substrate 14 of the light detecting element 12 arrives at the lower plane 11b of the substrate 11, passing through the grating base substance 25, and is made incident into the spectroscopic portion 13.

The incident light is reflected by the reflecting layer 28 of the spectroscopic portion 13 and also decomposed into individual spectral components by the wavelength thereof. The light is, then, emitted to the upper plane 11a of the substrate 11 via the grating base substance 25. The spectral components of the thus dispersed light are made incident, while being focused on the photodiode array 16 provided on the upper plane 11a, and detected by individually corresponding photodiodes 15.

As described so far, according to the spectrometer 1 of the present embodiment, the spectroscopic module 3 is supported by the support member 29 on the lower plane 11b in a state that the spectroscopic portion 13 provided on the lower plane 11b of the substrate 11 is spaced away from the stem 5. Therefore, where the spectrometer 1 is downsized, it is possible to prevent the spectroscopic portion 13 from being in contact with the stem 5. Then, spectrometer 1 can be downsize while maintaining reliability.

Next, a description will be given for the spectrometer of another first embodiment.

Figure 5:
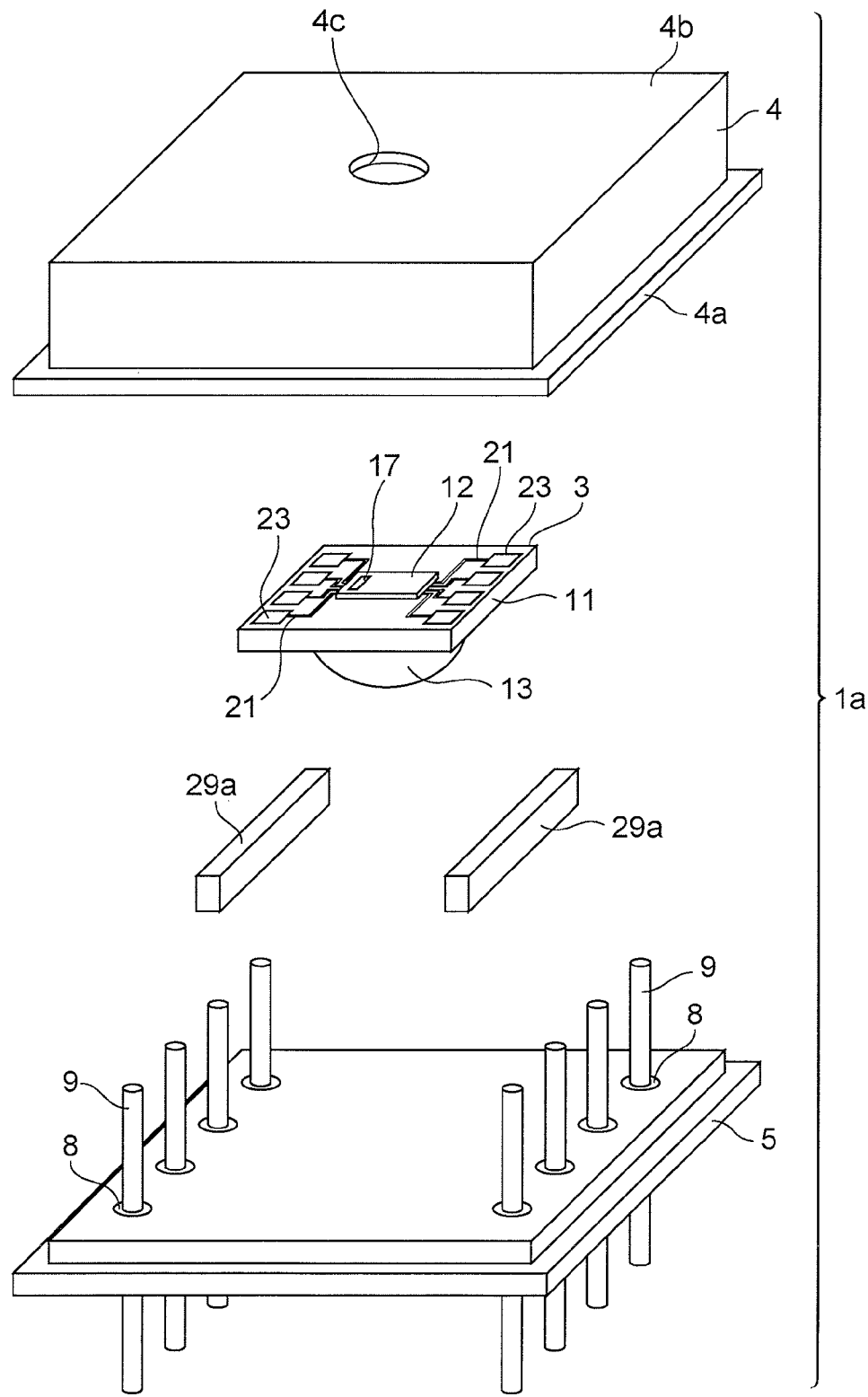
FIG. 5 is an exploded perspective view of the spectrometer of another first embodiment.
Figure 6:
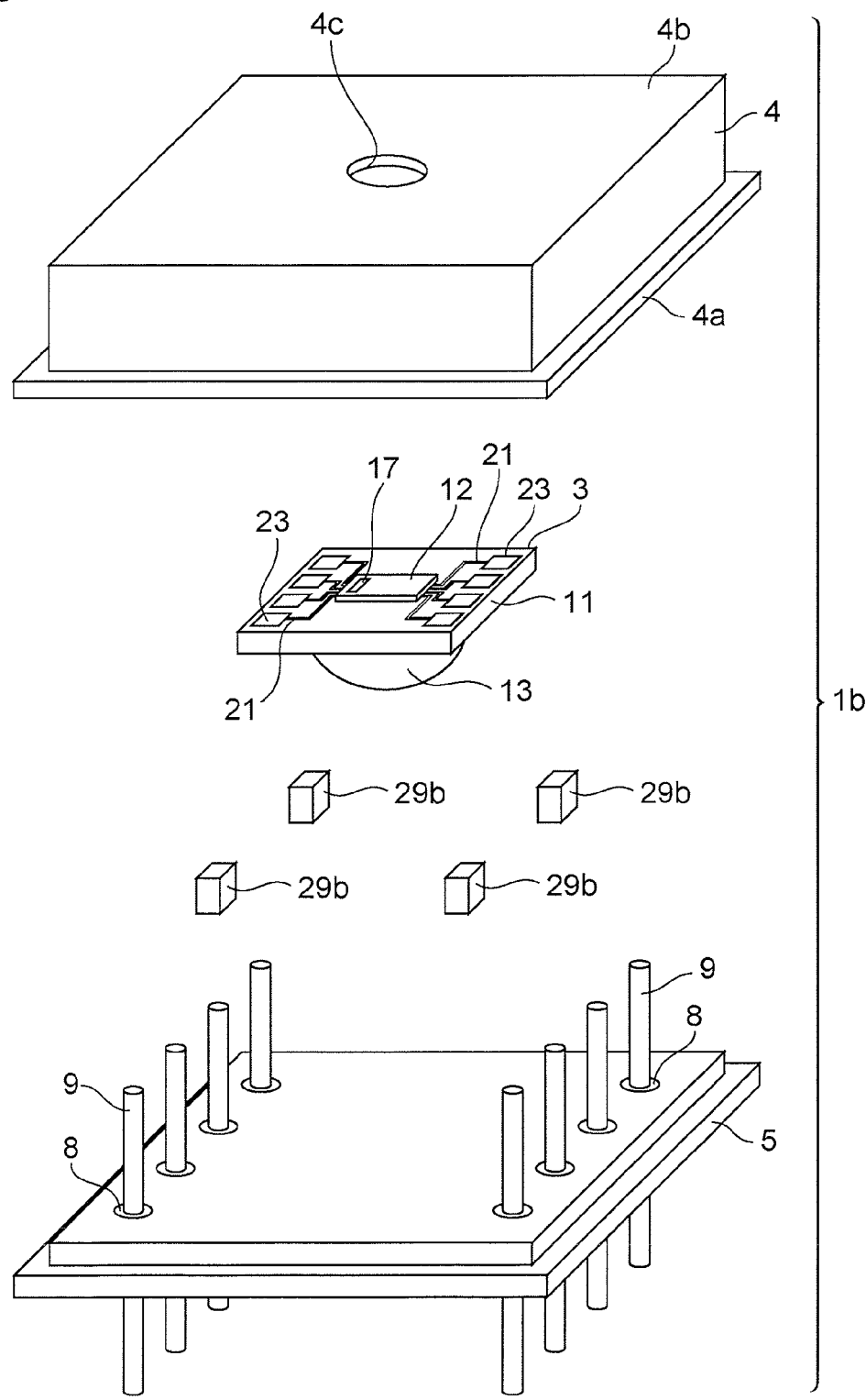
FIG. 6 is an exploded perspective view of the spectrometer of still another first embodiment.

As shown in FIG. 5 and FIG. 6, in the spectrometer of the first embodiment, the shape of the support member 29 may be changed to another shape.

As shown in FIG. 5, in a spectrometer 1a of another first embodiment, in place of the rectangular annular support member 29 of the above-described first embodiment, a pair of bar-shaped support members 29a are provided at opposing positions behind the spectroscopic portion 13. On the side of the substrate 11, the bar-shaped support member 29a is jointed at a position of the lower plane 11b in opposition to the electrode pad 23 along a direction at which a plurality of the electrode pads 23 formed on the upper plane 11a of the substrate 11 are arrayed. Further, the support member 29a used here is such that the height thereof is greater than that of the spectroscopic portion 13 projected from the substrate 11 to the outside (the reflecting layer 28) and arranged so that the stem 5 is spaced away from the spectroscopic portion 13.

According to the spectrometer 1a of another first embodiment, a pair of bar-shaped support members 29a are arranged so as to oppose each other behind the spectroscopic portion 13. Therefore, it is possible to more reliably prevent the spectroscopic portion 13 from being in contact with the stem 5.

Further, as shown in FIG. 6, in a spectrometer 1b of still another first embodiment, in place of the rectangular annular support member 29 of the above-described first embodiment, two pairs of column-shaped support members 29b are provided at opposing positions behind the spectroscopic portion 13. More specifically, the column-shaped support members 29b are arranged at positions corresponding to four corners of the rectangular substrate 11, and jointed at a position of the lower plane 11b opposing the electrode pad 23 provided on the upper plane 11a of the substrate 11. Further, the support member 29b used here is such that the height thereof is greater than that of the spectroscopic portion 13 (reflecting layer 28) projected from the substrate 11 to the outside and arranged so that the stem 5 is spaced away from the spectroscopic portion 13.

According to the spectrometer 1b of still another first embodiment, two pairs of column-shaped support members 29b are arranged so as to oppose each other behind the spectroscopic portion 13, thus making it possible to more reliably prevent the spectroscopic portion 13 from being in contact with the stem 5.

Figure 7:
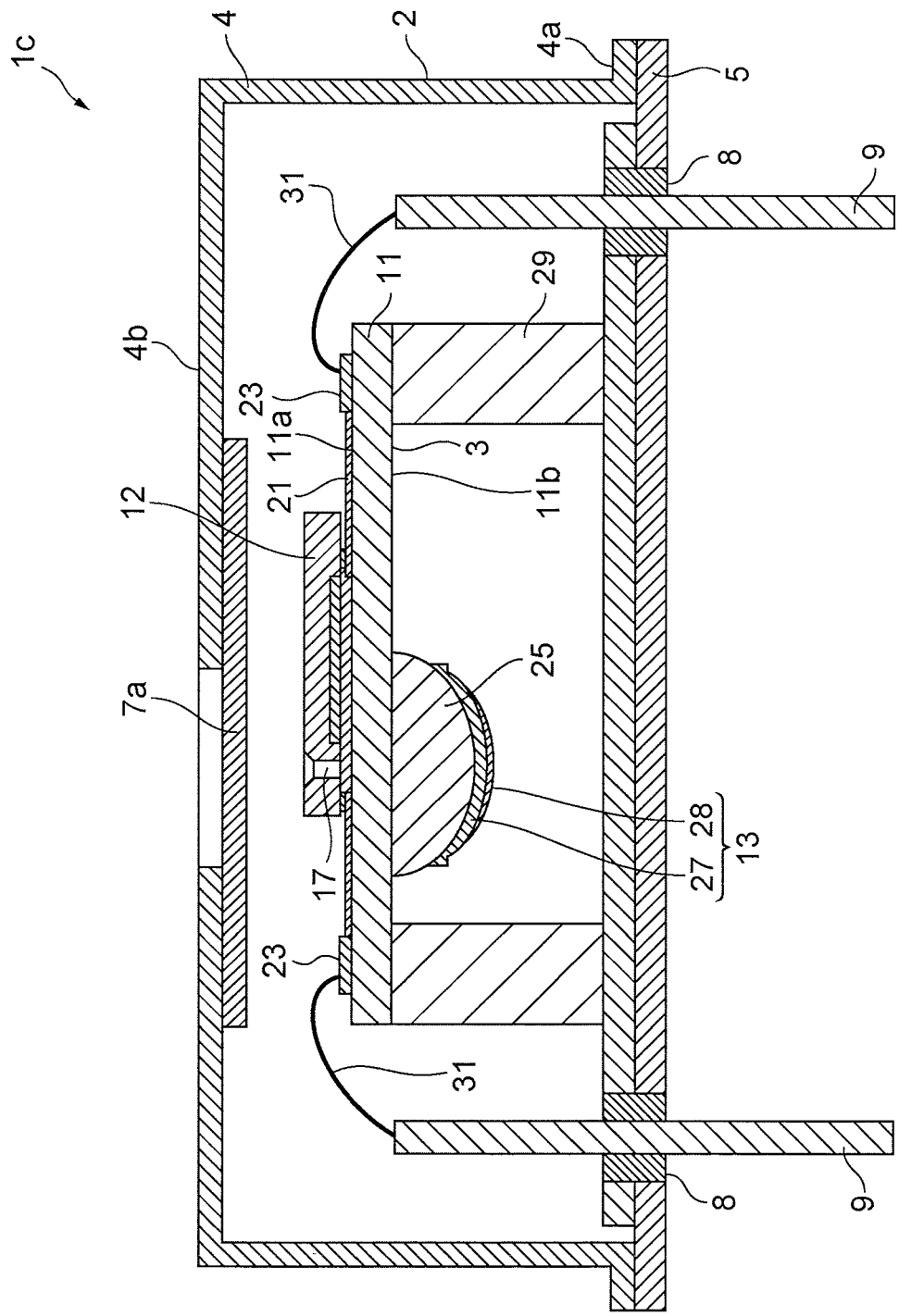
FIG. 7 is a cross sectional view of the spectrometer of the still another first embodiment.
Figure 8:
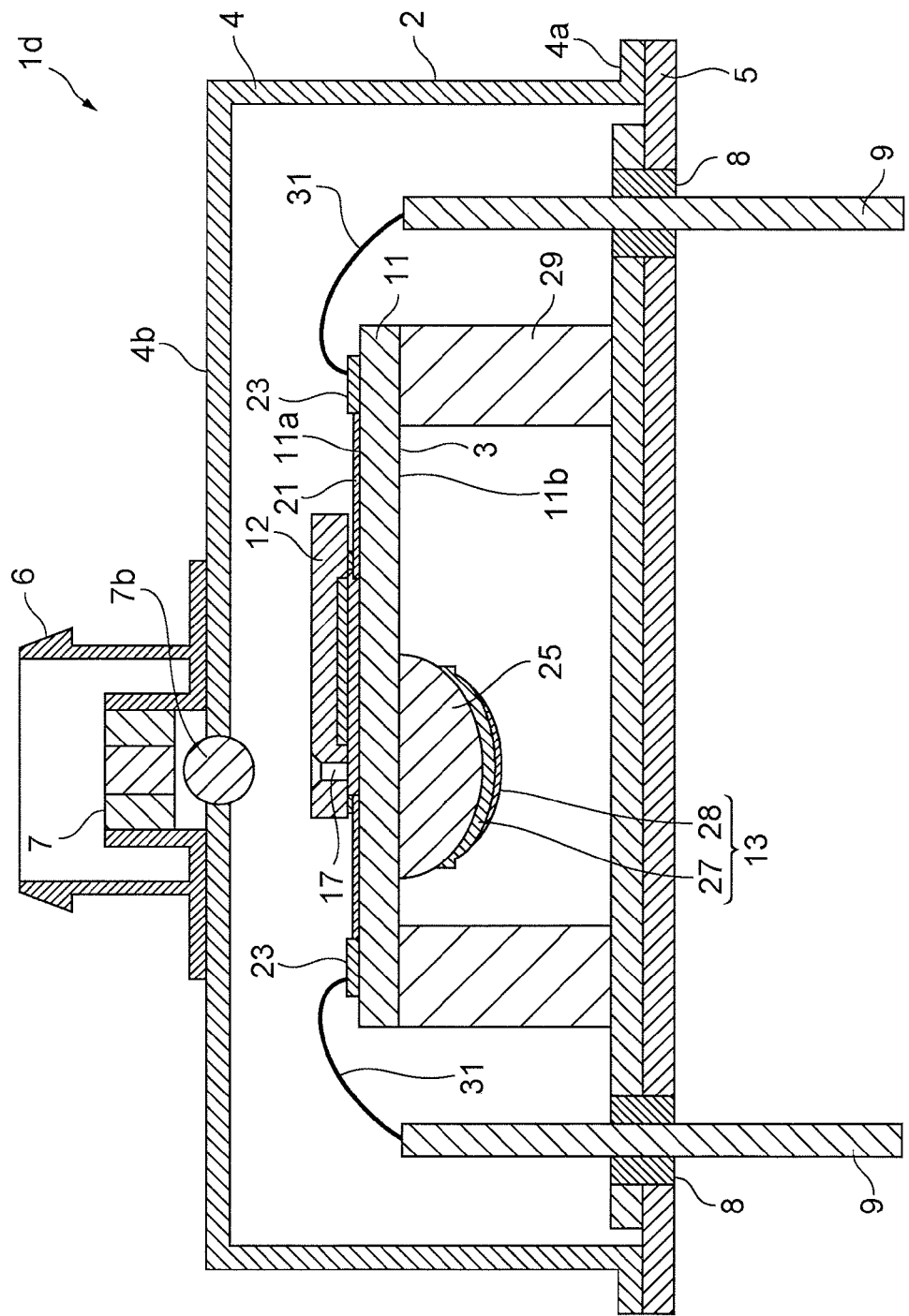
FIG. 8 is a cross sectional view of the spectrometer of the still another first embodiment.

Further, as shown in FIG. 7 and FIG. 8, in the spectrometer of the above-described first embodiment, the constitution of the light-guiding portion may be changed to another constitution.

As shown in FIG. 7, in a spectrometer 1c of still another first embodiment, in place of the optical fiber 7 of the above-described first embodiment, an incident light window 7a is provided so as to cover the cap opening portion 4c of the cap 4 from the inside. The incident light window 7a may be made with any material as long as it is able to transmit target light. For example, quartz, borosilicate glass (BK7), Pyrex (registered trade mark) glass, and Kovar may be used. Further, the incident light window 7a may be subjected to AR (anti reflection) coating, whenever necessary.

According to the spectrometer 1c of still another first embodiment, it is possible to regulate accurately a distance between the incident light window 7a and the light incident portion 17 of the spectroscopic module 3.

Further, as shown in FIG. 8, a spectrometer 1d of still another first embodiment is provided not only with the optical fiber 7 of the above-described first embodiment but also with a ball lens 7b at the cap opening portion 4c of the cap 4. The optical fiber 7 is inserted into a hollow portion inside the connector 6 so as not to extend inside the package 2 but extend to the vicinity of the upper part of the ball lens 7b. In the present embodiment, it is noted that the light-guiding portion may be constituted only with the ball lens 7b, with the optical fiber 7 and the connector 6 omitted.

Still further, the package used here may be available in various constitutions other than a constitution of the CAN package given in the previously described embodiment. For example, there may be used a constitution of a butterfly package or a ceramic package in which lead pins are provided on the side plane of the package.

Second Embodiment

Figure 9:
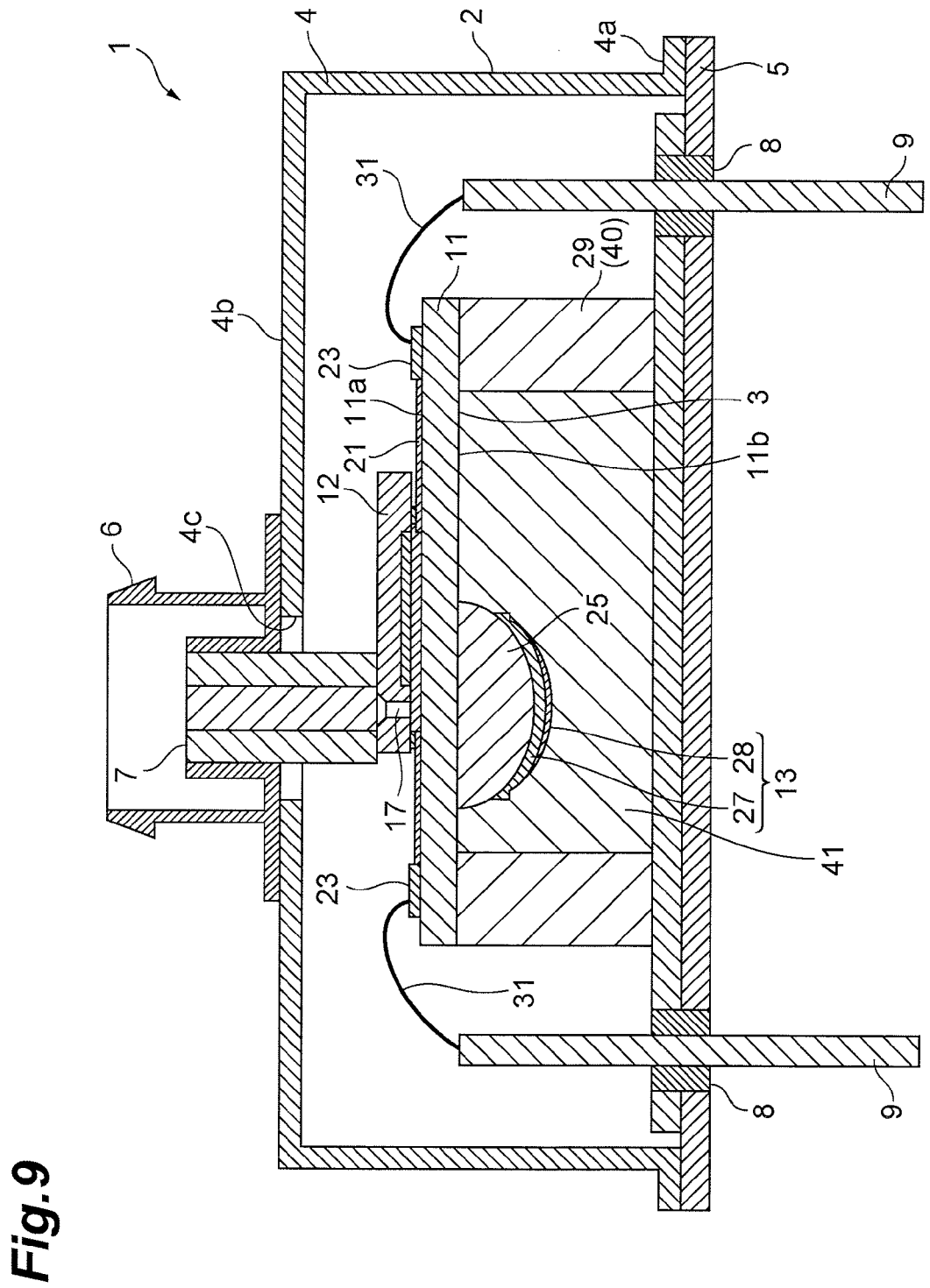
FIG. 9 is a cross sectional view of a spectrometer of a second embodiment of the present invention.
Figure 10:
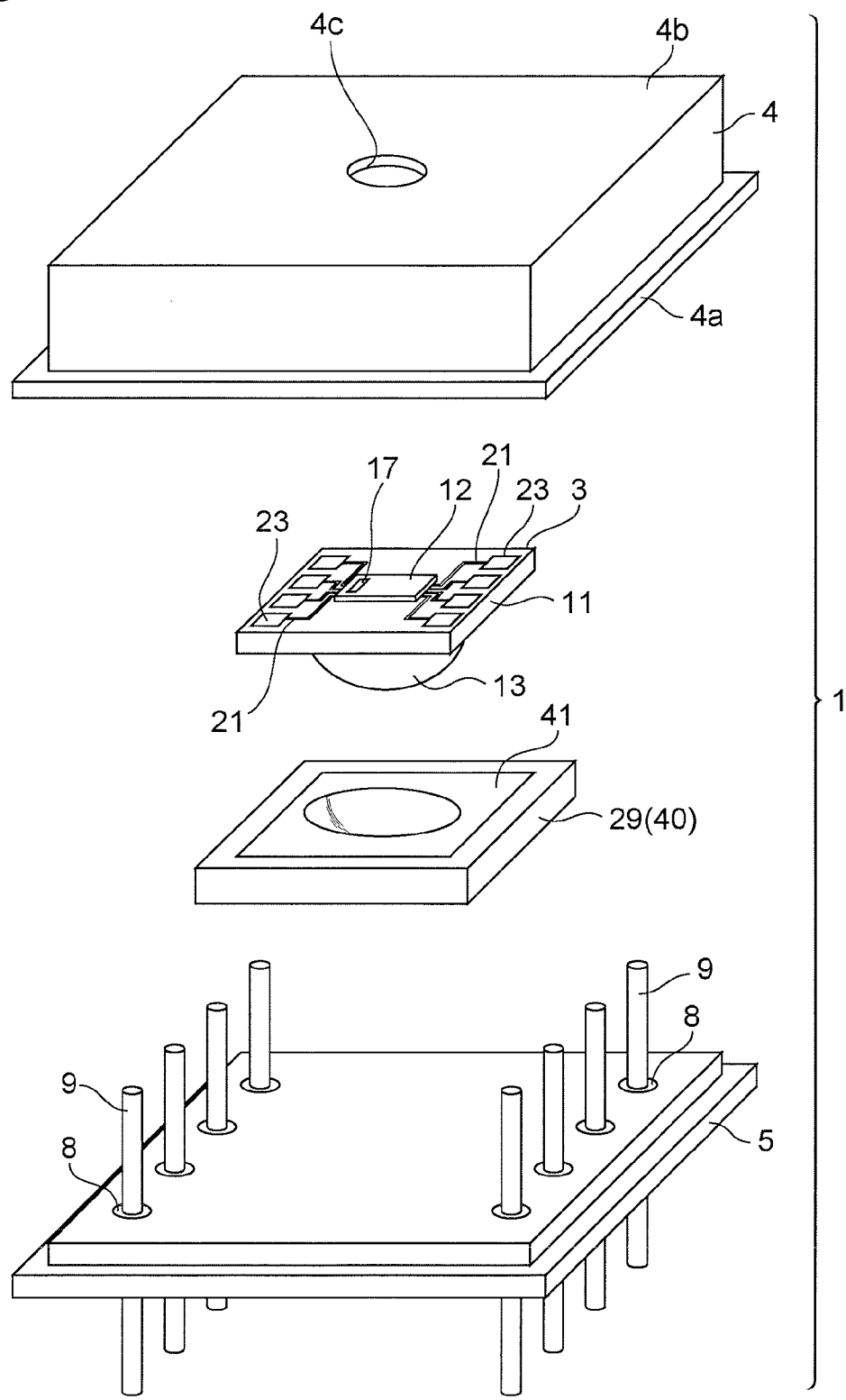
FIG. 10 is an exploded perspective view of the spectrometer given in FIG. 9.

As shown in FIG. 9 and FIG. 10, a spectrometer 1 of a second embodiment of the present invention is an apparatus in which a spectroscopic module 3 accommodated inside a package 2 is used to disperse target light made incident from outside into the package 2, thereby spectra of the thus dispersed light is detected and output.

The package 2 is constituted with a so-called CAN package which contains a rectangular-solid box-shaped metal cap 4 opened at one end and a rectangular plate-shaped metal stem 5 having a stepped portion at a peripheral edge. The cap 4 is provided with a flange 4a projecting from an opening end to the outside. Further, a stepped portion of the flange 4a and that of the stem 5 are jointed by welding to close an opening portion. Therefore, the package 2 can be given as a hermetic package to increase the reliability of the spectrometer 1. A cap opening portion 4c opened in a circular shape is formed on the upper wall 4b of the cap 4, and a hollow connector 6 is provided so as to cover the cap opening portion 4c. An optical fiber 7 (light-guiding portion) is inserted into a hollow portion of the connector 6. It is noted that the connector 6 and the optical fiber 7 are omitted in FIG. 10. The optical fiber 7 extends from the cap opening portion 4c into the package 2 so as to guide the target light into the package 2. A plurality of lead pins 9 are fixed to a pair of side edge portions of the stem 5, which are opposed to each other, via electrically insulating low-melting point glass 8, thereby the package 2 is hermetically sealed (air-tight seal). The lead pin 9 is made with an electrically conductive material such as copper wire, and the one end thereof extends inside the package 2, while the other end is guided to the outside of the package 2.

Figure 11:
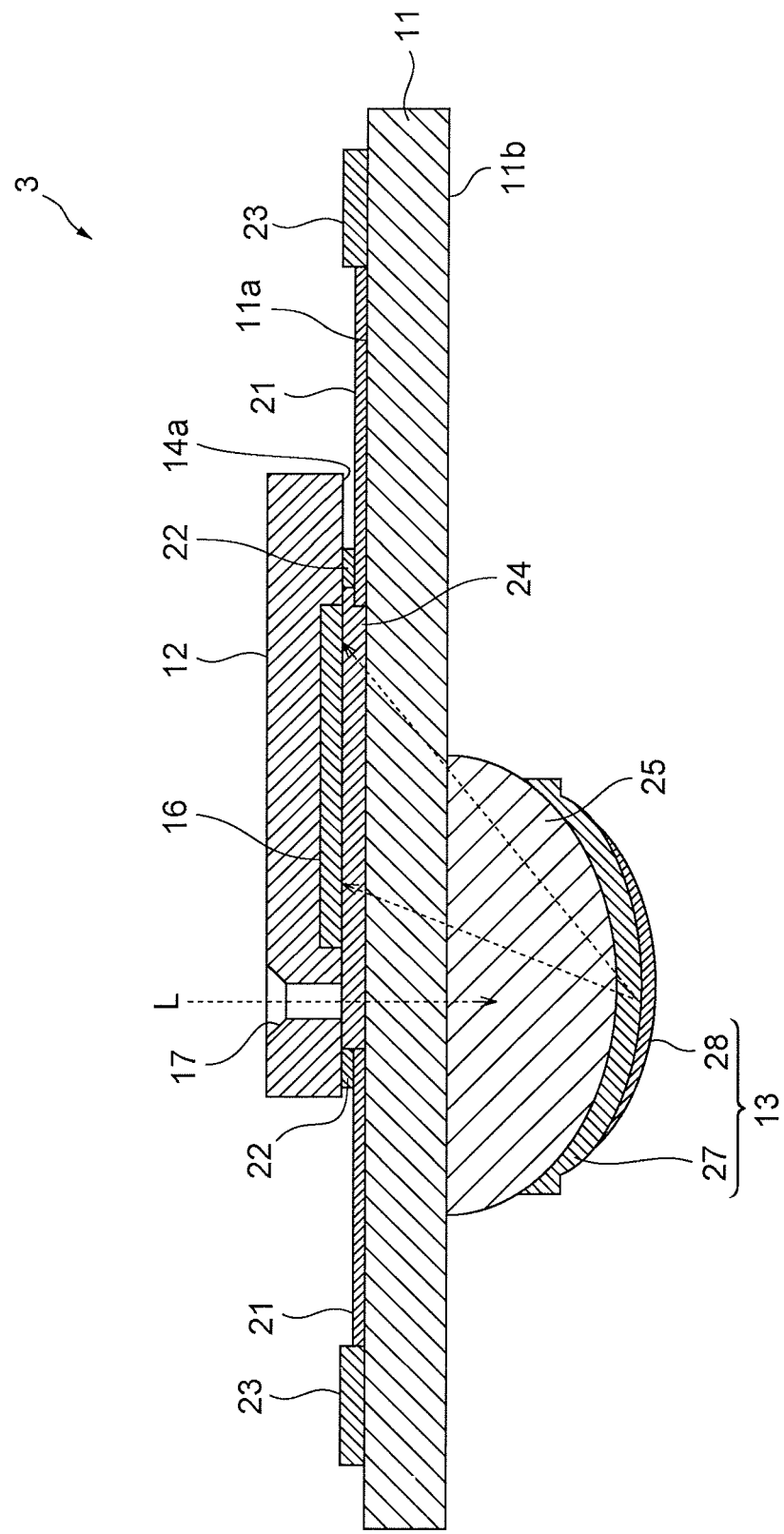
FIG. 11 is a cross sectional view of the spectroscopic module given in FIG. 9.

As shown in FIG. 11, the spectroscopic module 3 is provided with a rectangular substrate (body portion) 11 made with glass or a resin material. The substrate 11 allows target light L to be dispersed in a predetermined range to pass through, thereby retaining a light detecting element 12 and a spectroscopic portion 13, which will be described later. The light detecting element 12 for detecting light is provided approximately at the center on the upper plane 11a opposing the upper wall 4b of the cap 4 on the substrate 11.

Figure 12:
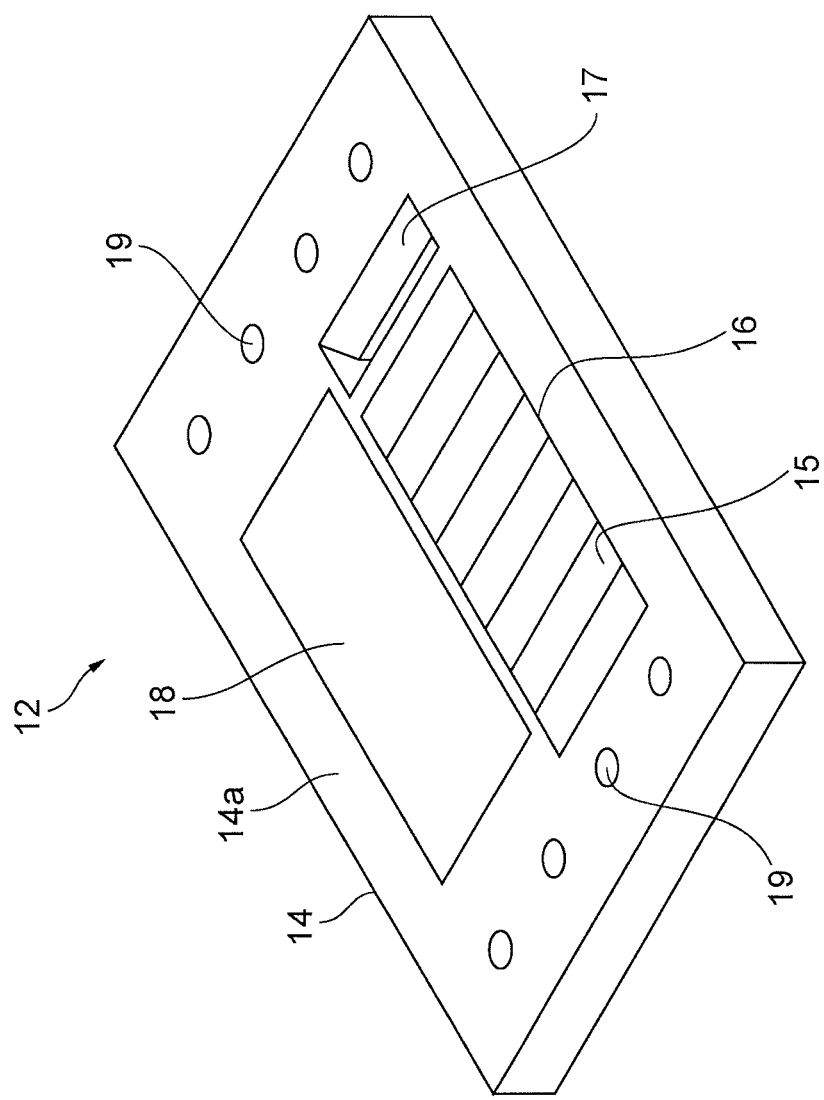
FIG. 12 is a perspective view of the light detecting element given in FIG. 11.

As shown in FIG. 12, the light detecting element 12 is provided with a semiconductor substrate 14 made with a semi-conducting material, for example, silicon (Si). A photodiode array 16 having a plurality of photodiodes 15 is formed in a predetermined array on the upper plane 14a of the semiconductor substrate 14. The photodiode array 16 is used for detecting spectral components of the dispersed light.

Further, a rectangular slit-shaped opening portion 17 which penetrates from the upper plane 14a to the lower plane is formed on the semiconductor substrate 14. The opening portion 17 is used as a light incident portion for making target light detected by the photodiode 15 incident into the substrate 11, where the light detecting element 12 is applied to a spectrometer mounted on the substrate 11. This is provided by being positioned in advance on the basis of a predetermined positional relationship with respect to the photodiode array 16. It is noted that the light incident portion (opening portion) 17 may be formed on the upper plane 11a of the substrate 11 as a separate body from the semiconductor substrate 14.

Still further, an electronic circuit portion 18 is provided on the upper plane 14a. A wiring, a circuit and others necessary for applying bias voltage to each of the photodiodes 15 and treating a signal are provided on the electronic circuit portion 18. Bump electrode pads 19 used for inputting and outputting an electrical signal are provided respectively on the left end and the right end of the upper plane 14a.

Returning to FIG. 11, a plurality of substrate wirings 21 for sending input and output signals of the light detecting element 12 are formed on the upper plane 11a of the substrate 11. One end of each of the substrate wirings 21 is connected to a bump 22 such as Au for fixing the light detecting element 12, while the other end thereof is connected to the electrode pad 23 for external input and output which is formed at the peripheral edge on the upper plane 11a. The light detecting element 12 is subjected to bump bonding by the bump 22 so that the upper plane 14a of the semiconductor substrate 14 on which the photodiode array 16 is formed is opposed to the upper plane 11a of the substrate 11 and mounted on the substrate 11. Further, an underfill material 24 is packed into a gap made between the substrate 11 and the light detecting element 12 by bump bonding, thereby they are optically coupled.

Further, a grating base substance 25 made with a light transmitting material such as glass or a translucent resin is provided at a predetermined position which is on a light path of target light L made incident from the light incident portion 17 on the lower plane 11b of the substrate 11 (a plane opposing a predetermined plane or the upper plane 11a). The grating base substance 25 is an approximately semi-spherical lens projecting on the lower plane 11b of the substrate 11 or to the outside of the substrate 11 at the center of a predetermined position in the vicinity thereof. The grating base substance 25 may be provided as a separate body from the substrate 11 or may be formed integrally with the substrate 11 by forming a curved plane portion having a certain curvature on the lower plane 11b of the substrate 11.

Further, a spectroscopic portion 13 is provided on the surface of the grating base substance 25. The spectroscopic portion 13 is to disperse target light L which has been made incident from the light incident portion 17 and passed through the grating base substance 25. The spectroscopic portion 13 of the present embodiment is a reflection-type concave diffraction grating constituted with a diffracting layer 27 made with a resin material and provided on the grating base substance 25 and a reflecting layer 28 made with a reflecting film of metal such as aluminum and provided on the surface of the diffracting layer 27. Still further, the surface of the diffracting layer 27, that is, a reflecting plane, is provided with a curvature radius approximately similar to the curvature radius of a curved plane (surface) of the grating base substance 25 and formed in adjustment so that a direction at which light is dispersed is in agreement with a direction at which the photodiodes 15 are arrayed in the photodiode array 16. In the present embodiment, since the diffracting layer 27 is made with a resin material, it can be easily formed in a predetermined shape. Further, the inner wall plane of the package 2, that is, the stem 5, is spaced away from the spectroscopic portion 13 by the support member 29. Therefore, heat on welding the cap 4 and the stem 5 is less likely to be transferred to the spectroscopic portion 13, making it possible to protect the diffracting layer 27 made with a resin material which is vulnerable to heat-related defects.

Returning to FIG. 9 and FIG. 10, the above-described spectroscopic module 3 is supported via a rectangular annular support member 29 (annular portion 40) so as to enclose the spectroscopic portion 13 inside the package 2 and fixed to the stem 5. The support member 29 is jointed to the substrate 11 at a position of the lower plane 11b opposing a position of the electrode pad 23 formed on the upper plane 11a of the substrate 11 in the spectroscopic module 3. Therefore, the support member 29 acts as a base in connecting the electrode pad 23 to the lead pin 9 by wire bonding, thus making it possible to prevent the spectroscopic module 3 from breakage or the like. Further, the support member 29 used here is such that the height thereof is greater than that of the spectroscopic portion 13 (reflecting layer 28) projected from the substrate 11 to the outside and arranged so that the stem 5 is spaced away from the spectroscopic portion 13. Thereby, it is possible to prevent the spectroscopic portion 13 from being in contact with the stem 5 when the spectrometer 1 is subjected to vibration or thermal load. Thus, the spectrometer 1 can be downsize while maintaining reliability.

Further, the spectroscopic portion 13 is arranged so as to be sealed inside the rectangular annular support member 29, and a light absorbing portion 41 is packed across the space formed inside the annular portion 40. Light absorbing materials include, for example, a composite material, which is a mixture of a silicon-, epoxy-, urethane-, acryl-, or polyimide-based resin with light-absorbing particles such as a black filler. These light absorbing materials may be in a solid form or in a liquid form. The light absorbing portion 41 is formed after the support member 29 is fitted into the stem 5, a light absorbing material is packed inside the support member 29 and the spectroscopic module 3 is fitted on the support member 29.

The spectroscopic module 3 fixed by the support member 29 is arranged so that the light incident portion 17 thereof is adjusted at a position opposing the end of the optical fiber 7, which is a light-guiding portion. Further, the end of the optical fiber 7 guided into the package 2 is inserted so as to be in contact with the light incident portion 17 of the spectroscopic module 3. Therefore, the optical fiber 7 constituting the light-guiding portion is easily positioned, and light can be reliably made incident from the optical fiber 7 into the light incident portion 17.

Further, the electrode pad 23 formed on the upper plane 11a of the substrate 11 is electrically connected to the lead pin 9 of the stem 5 with a wire 31 by wire bonding.

In the thus constituted spectrometer 1, target light L guided from the optical fiber 7 and made incident from the light incident portion 17 provided on the semiconductor substrate 14 of the light detecting element 12 arrives at the lower plane 11b of the substrate 11, passing through the grating base substance 25, and is made incident into the spectroscopic portion 13.

The incident light is reflected by the reflecting layer 28 of the spectroscopic portion 13 and also decomposed into individual spectral components by the wavelength thereof. The light is, then, emitted to the upper plane 11a of the substrate 11 via the grating base substance 25. The spectral components of the thus dispersed light are made incident, while being focused on the photodiode array 16 provided on the upper plane 11a, and detected by individually corresponding photodiodes 15.

As described so far, according to the spectrometer 1 of the present embodiment, the support member 29 for supporting the spectroscopic module 3 is provided with an annular portion 40 enclosing the spectroscopic portion 13 and the light absorbing portion 41 is packed in a space formed inside the annular portion 40. Therefore, it is possible to block reliably stray light entering into the spectroscopic portion 13 from outside and also reliably absorb the stray light generated inside the spectroscopic portion 13. For this reason, there is no chance to detect the stray light as noise. As a result, it is possible to downsize the spectrometer 1, while maintaining the reliability thereof and, in particular, accurate spectral characteristics.

Next, a description will be given for the spectrometers of other second embodiments.

Figure 13:
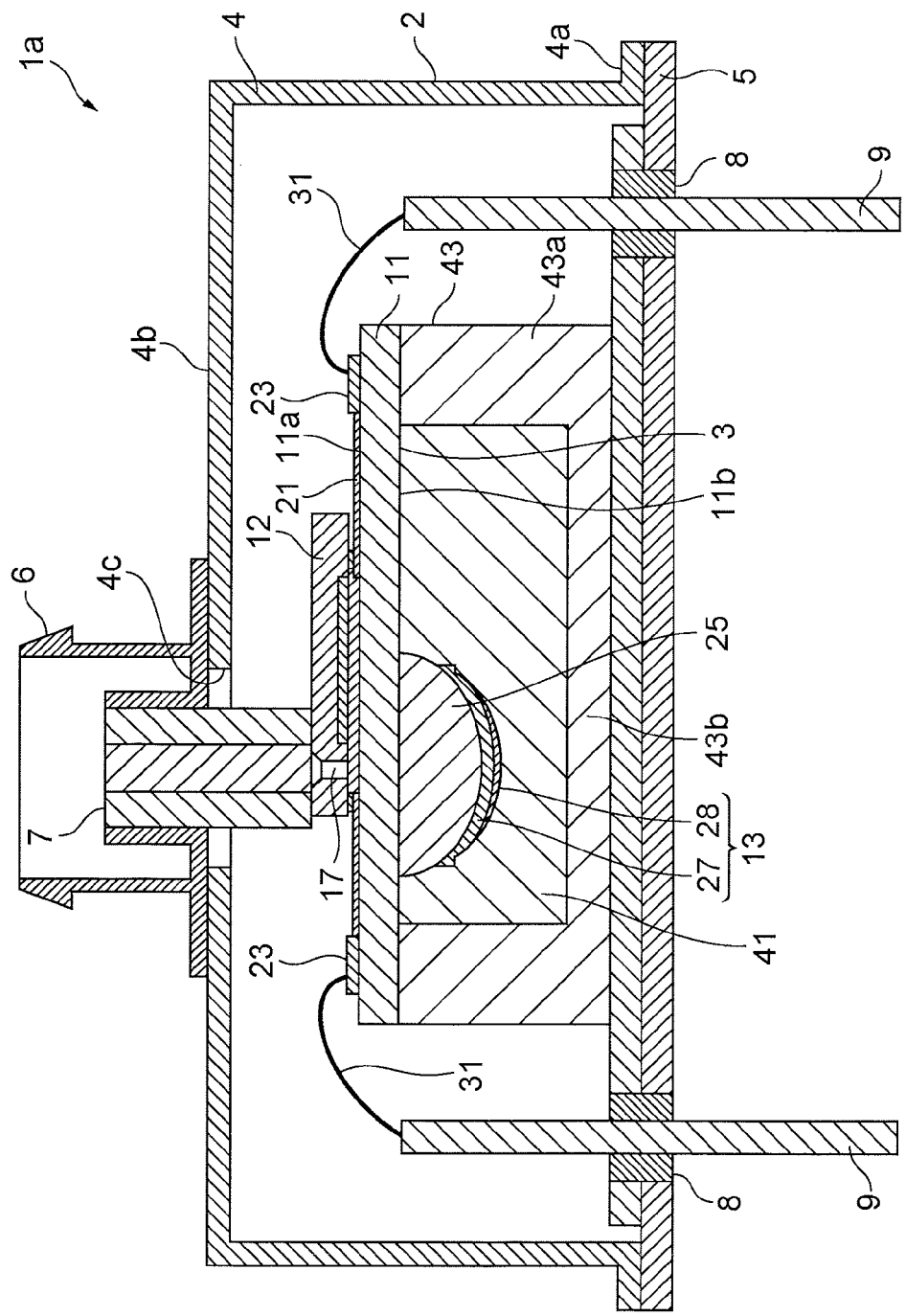
FIG. 13 is a cross sectional view of the spectrometer of another second embodiment.

As shown in FIG. 13, in the spectrometer of the above-described second embodiment, the shape of the support member 29 is changed to another shape.

As shown in FIG. 13, a spectrometer 1a of another second embodiment is provided with a box-shaped support member 43 opened on one plane in place of the rectangular annular support member 29 of the above-described second embodiment. The support member 43 is provided with a rectangular annular side wall (annular portion) 43a and a rectangular lower wall (plate-shaped portion) 43b formed so as to close one end of the stem 5 of the side wall 43a. On the side of the substrate 11, the support member 43 is jointed to the substrate 11 so that the open end is set along a position of the lower plane 11b opposing a position of the electrode pad 23 formed on the upper plane 11a of the substrate 11 in the spectroscopic module 3. On the contrary, on the side of the stem 5, the outer plane of the lower wall 43b is jointed to the stem 5.

According to the spectrometer 1a of another second embodiment, the support member 43 is provided with a rectangular lower wall 43b formed so as to cover one end of the stem 5 on the side wall 43a. Therefore, a light absorbing material which acts as the light absorbing portion 41 can be packed in advance in a space formed inside the side wall 43a in fixing the support member 43 inside the package 2. Thus, it is possible to easily produce the spectrometer 1a in which the light absorbing portion 41 is formed.

Figure 14:
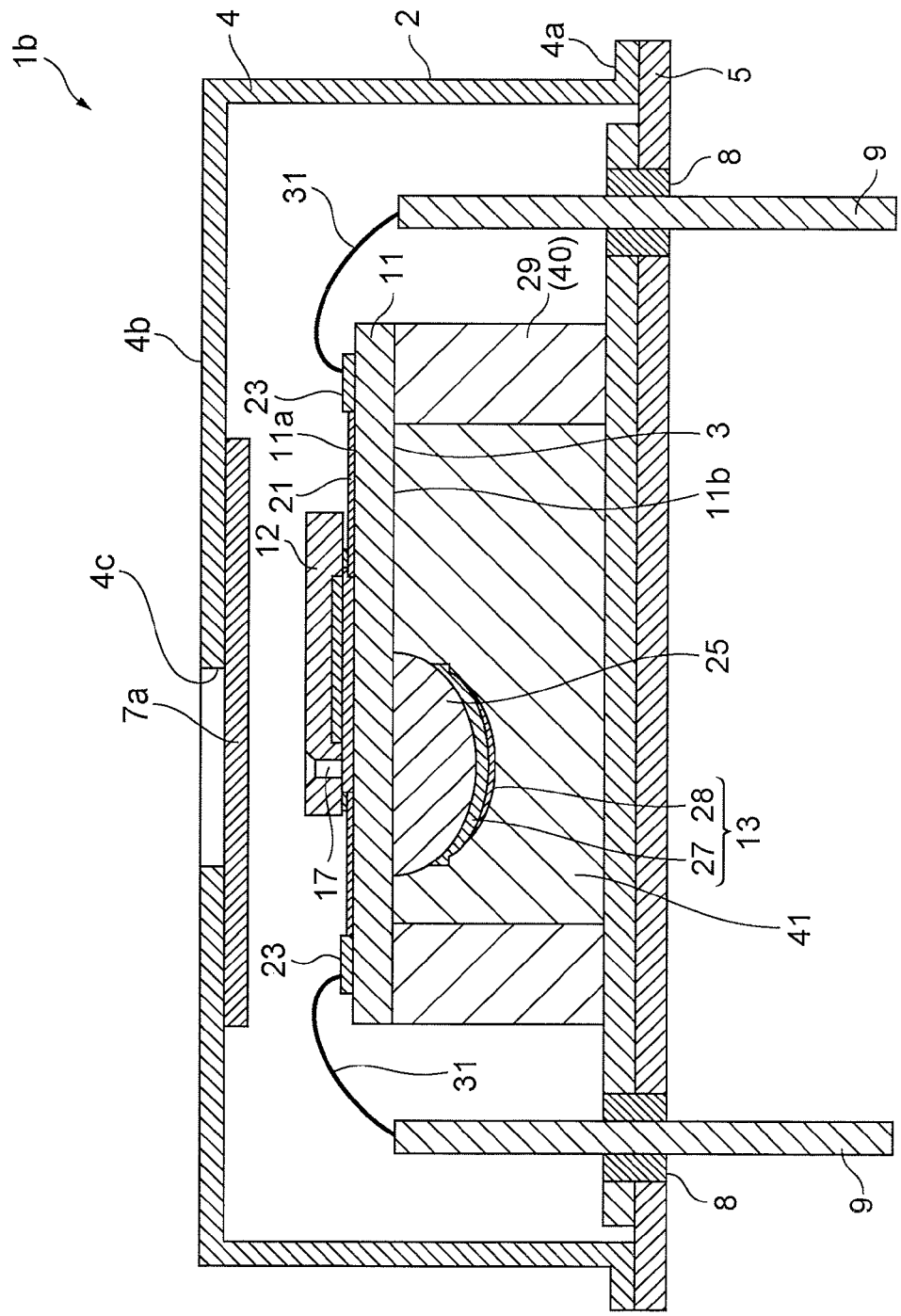
FIG. 14 is a cross sectional view of the spectrometer of still another second embodiment.
Figure 15:
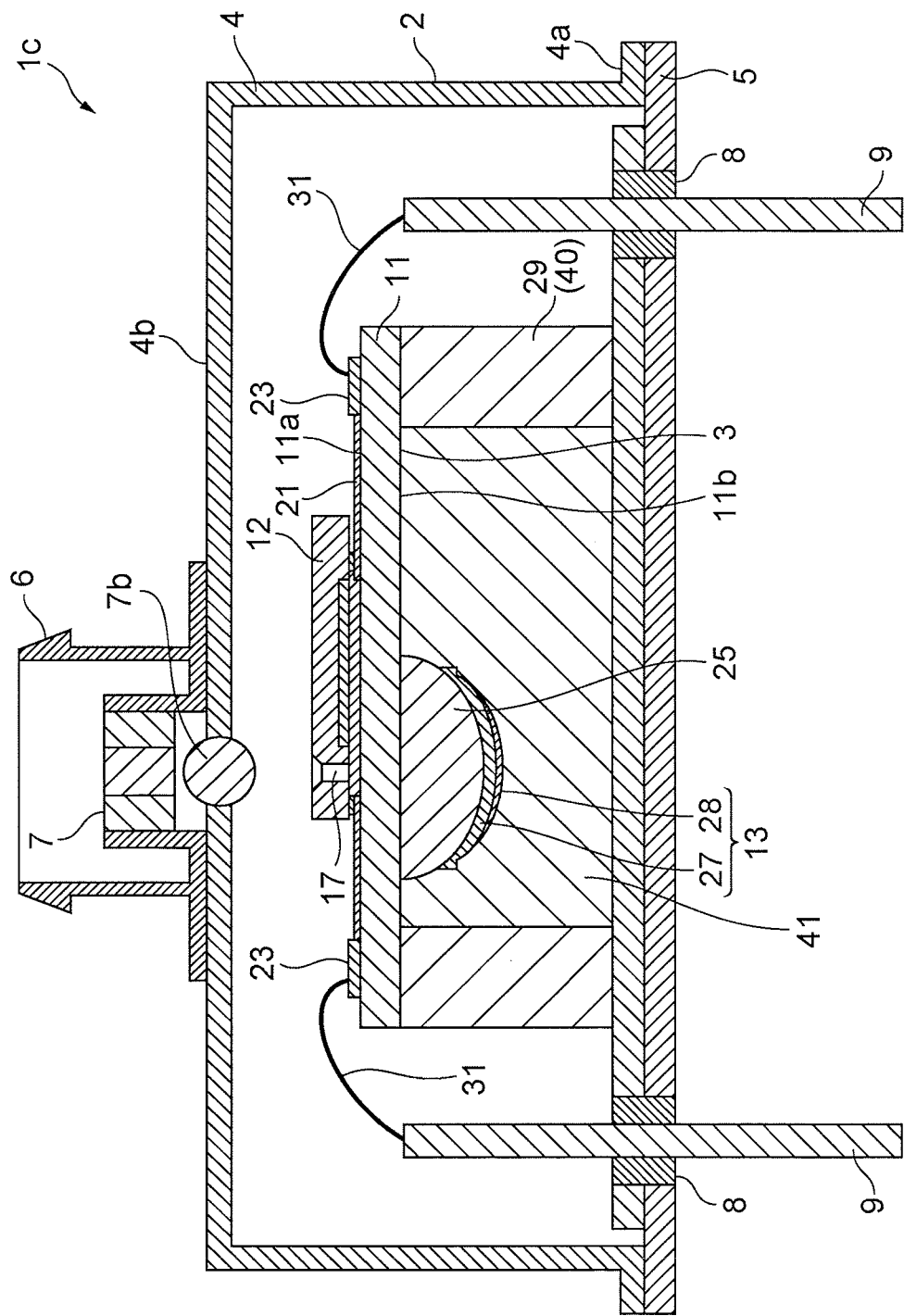
FIG. 15 is a cross sectional view of the spectrometer of still another second embodiment.

Further, as shown in FIG. 14 and FIG. 15, in the spectrometer of the above-described second embodiment, the constitution of the light-guiding portion can be changed to another constitution.

As shown in FIG. 14, a spectrometer 1b of still another second embodiment is provided with an incident light window 7a so as to cover the cap opening portion 4c of the cap 4 from inside in place of the optical fiber 7 of the second embodiment. The incident light window 7a may be made with any material as long as it is able to transmit target light. For example, quartz, borosilicate glass (BK7), Pyrex (registered trade mark) glass, and Kovar may be used. Further, the incident light window 7a may be subjected to AR (anti reflection) coating, whenever necessary.

According to the spectrometer 1b of still another second embodiment, it is possible to regulate accurately a distance between the incident light window 7a and the light incident portion 17 of the spectroscopic module 3.

Further, as shown in FIG. 15, a spectrometer 1c of still another second embodiment is provided not only with the optical fiber 7 of the second embodiment but also with the ball lens 7b at the cap opening portion 4c of the cap 4. The optical fiber 7 is inserted into a hollow portion inside the connector 6 so as not to extend inside the package 2 but extend to the vicinity of an upper part of the ball lens 7b. In the present embodiment, it is noted that the light-guiding portion may be constituted only with the ball lens 7b, with the optical fiber 7 and the connector 6 omitted. Light transmitted through a lens is preferably focused at the light incident portion 17. The lens is not limited to a ball-shaped lens but may include a concave lens, a convex lens, a cylindrical lens, a Fresnel lens, and an achromatic lens.

Still further, the package used here may be available in various constitutions other than a constitution of the CAN package given in the previously described embodiment. For example, there may be used the constitution of a butterfly package or a ceramic package in which lead pins are provided on the side plane of the package.

INDUSTRIAL APPLICABILITY

According to the present invention, it is possible to downsize a spectrometer while maintaining reliability.

The invention claimed is:

1. A spectrometer comprising: a package on which a light-guiding portion is provided;
a plurality of support members arranged in an inner wall plane of the package;
a substrate to which the support members are jointed;
a light detecting element mounted on the substrate; and
a spectroscopic portion arranged between the support members opposed to each other for dispersing light made incident from the light-guiding portion and reflecting the light to the light detecting element,
wherein the package is provided with a cap provided with the light-guiding portion and a stem in which the support members are arranged,
an inner wall plane of the cap provided with the light-guiding portion opposes an upper plane of the substrate supported on the stem by the support members, and
the spectroscopic portion is disposed between a lower plane of the substrate and the inner wall plane of the stem.

2. The spectrometer as set forth in claim 1, wherein the cap and the stem are jointed hermetically.

3. The spectrometer as set forth in claim 1, wherein the cap is rectangular-solid box-shaped and the stem is rectangular plate-shaped.

4. The spectrometer as set forth in claim 1, wherein the light-guiding portion is an incident light window covering an opening portion with which the cap is provided.

5. The spectrometer as set forth in claim 1, wherein a plurality of lead pins penetrating through the stem are fixed to a pair of side edge portions of the stem, which are opposed to each other.

6. The spectrometer as set forth in claim 1, wherein a light incident portion for making the light incident from the light-guiding portion into the substrate is provided on the substrate.

7. The spectrometer as set forth in claim 1, wherein the light detecting element is provided with a semiconductor substrate and
a light incident portion for making the light incident from the light-guiding portion into the substrate is provided on the semiconductor substrate.

8. The spectrometer as set forth in claim 1, further comprising a plurality of lead pins, which penetrate through the package,
wherein the substrate is provided with a plurality of electrode pads electrically connected to the lead pins respectively by a wire and
the support members are jointed to the substrate at a part opposing the electrode pad on the substrate.

9. A spectrometer comprising: a package having a cap and a stem, the cap provided with a light incident portion;
a support member disposed on the stem inside the package;
a substrate integrated with the support member;
a light detecting element mounted on the substrate; and
a spectroscopic portion disposed between the substrate and the stem for dispersing light made incident from the light incident portion and reflecting the light to the light detecting element,
an inner wall plane of the cap provided with the light incident portion opposes an upper plane of the substrate supported on the stem by the support members, and
the spectroscopic portion is disposed between the lower plane of the substrate and the inner wall plane of the stem.

* * * * *